(12) United States Patent
Daniel

(10) Patent No.: US 11,731,645 B2
(45) Date of Patent: Aug. 22, 2023

(54) DRIVER WARNING SYSTEM

(71) Applicant: Haim Daniel, Bat Yam (IL)

(72) Inventor: Haim Daniel, Bat Yam (IL)

(*) Notice: Subject to any disclaimer, the term of this patent is extended or adjusted under 35 U.S.C. 154(b) by 710 days.

(21) Appl. No.: 16/876,139

(22) Filed: May 18, 2020

(65) Prior Publication Data

US 2020/0369291 A1    Nov. 26, 2020

Related U.S. Application Data

(60) Provisional application No. 62/851,108, filed on May 22, 2019.

(51) Int. Cl.
| | |
|---|---|
| *B60W 50/14* | (2020.01) |
| *B60W 40/06* | (2012.01) |
| *B60W 40/09* | (2012.01) |
| *B60K 35/00* | (2006.01) |
| *G07C 5/00* | (2006.01) |
| *B60W 40/08* | (2012.01) |

(52) U.S. Cl.
CPC ............ *B60W 50/14* (2013.01); *B60K 35/00* (2013.01); *B60W 40/06* (2013.01); *B60W 40/09* (2013.01); *G07C 5/008* (2013.01); *B60K 2370/178* (2019.05); *B60K 2370/589* (2019.05); *B60W 2040/0809* (2013.01); *B60W 2050/146* (2013.01); *B60W 2555/20* (2020.02); *B60W 2555/60* (2020.02); *B60W 2556/45* (2020.02)

(58) Field of Classification Search
CPC ...... B60W 50/14; B60W 40/06; B60W 40/09; B60W 2556/45; B60W 2555/20; B60K 35/00; B60K 2370/589; B60K 2370/178; G07C 5/008
See application file for complete search history.

(56) References Cited

U.S. PATENT DOCUMENTS

2015/0057831 A1* 2/2015 Finlow-Bates .. G08G 1/096758 701/1

* cited by examiner

*Primary Examiner* — Michael D Lang

(57) ABSTRACT

There is disclosed system to warn a driver about driving laws and/or conditions. Optionally, the system includes a database of traffic laws, for example indexed according to location and/or time and/or conditions. For example, the device may display a speed limit reflecting local conditions such as weather, construction, school hours. In some embodiments, warnings may be customized to a particular vehicle and/or driver. In some embodiments, the system may warn a third party about driving behavior and/or legal infringements.

26 Claims, 5 Drawing Sheets

DRIVER WARNING SYSTEM

RELATED APPLICATION/S

This application claims the benefit of priority under 35 USC § 119(e) of U.S. Provisional Patent Application No. 62/851,108 filed May 22, 2019, the contents of which are incorporated herein by reference in their entirety.

FIELD AND BACKGROUND OF THE INVENTION

The present invention, in some embodiments thereof, relates to a for informing a driver and, more particularly, but not exclusively, a system that warns a driver and/or reports dangerous driving.

SUMMARY OF THE INVENTION

According to an aspect of some embodiments of the invention, there is provided a driver warning system including: a computer display configured for viewing by the driver while driving an on road vehicle; an on board processor configured to travel with the on road vehicle and the driver; a position sensor configured to travel with the on-road vehicle and the driver; a wireless transceiver configured to travel with the on road vehicle and the driver; a database with data available to the on board processor, the database including data on street locations and at least one of traffic laws and safety instructions for driving; wherein the processor is configured to receive data on transient conditions over the wireless transceiver and wherein the traffic laws include laws that are dependent on the transient conditions and wherein the processor is configured to display a traffic law to the driver on the display updated according to the transient conditions.

According to some embodiments of the invention, the processor is configured to receive weather updates over the wireless transceiver and to display a traffic law dependent on a current weather condition.

According to some embodiments of the invention, the updated traffic law includes a speed limit.

According to some embodiments of the invention, the database further includes data on a physical condition of a road surface and wherein the processor is configured to display safety instructions accounting for the physical condition of the road surface.

According to some embodiments of the invention, the processor is configured to receive schedule information of an educational institution and to display a traffic law dependent on a schedule of a nearby educational institution.

According to some embodiments of the invention, the processor is configured to receive updates on road condition over the wireless transceiver from a crowdsource based database and wherein the processor is configured to display safety instructions accounting for data from the crowdsource based database.

According to some embodiments of the invention, the system further includes a database of specification of the vehicle in communication with the processor and wherein the processor is configured to display safety instructions accounting for the specifications.

According to some embodiments of the invention, the processor is configured to receive schedule information of parking and to parking instructions dependent on the schedule.

According to some embodiments of the invention, the they system further includes: a sensor detecting a behavior of the driver the sensor reporting results to the processor and wherein the processor is configured to send data on the behavior to an overseer of the vehicle when the behavior is not in accordance at least one of a law from the database and a safety instruction from the database.

According to some embodiments of the invention, the sensor includes at least one of a speedometer, the position sensor, a microphone sensing sounds in the vehicle, a video camera receiving images form inside the vehicle, a video camera receiving images from outside the vehicle, an accelerometer, a lidar, and a radar.

According to some embodiments of the invention, overseer includes at least one of police, a licensing authority of the vehicle, a licensing authority of the driver and an owner of the vehicle.

According to some embodiments of the invention, the system further includes a driver identification subsystem.

According to some embodiments of the invention, the driver identification subsystem includes a camera and face recognition software.

According to some embodiments of the invention, the driver identification subsystem includes a microphone and voice recognition software.

According to some embodiments of the invention, the driver identification subsystem includes a fingerprint reader.

According to an aspect of some embodiments of the invention, there is provided a method of warning a driver of a vehicle including: detecting a location of the vehicle; receiving data on a transient condition at the location; transmitting at least one of the location and the data to a databank over a wireless transceiver; associating by a processor of the location and the condition to a traffic law; displaying the traffic law to the driver.

According to some embodiments of the invention, the condition includes a weather update.

According to some embodiments of the invention, the traffic law includes a speed limit.

According to some embodiments of the invention, condition includes a physical condition of a road surface at the location and the displaying includes safety instructions accounting for the physical condition of the road surface.

According to some embodiments of the invention, the condition includes schedule information of an educational institution.

According to some embodiments of the invention, the processor is configured to receive updates on road condition over the wireless transceiver from a crowdsource based database and wherein the processor is configured to display safety instructions accounting for data from the crowdsource based database.

According to some embodiments of the invention, the method further includes receiving data on specifications of the vehicle and wherein the displaying includes safety instructions accounting for the specifications.

According to some embodiments of the invention, the method further includes receive schedule information of parking at the location by the processor and displaying parking instructions to the driver dependent on the schedule.

According to some embodiments of the invention, the they method further includes: detecting a behavior of the driver by processor and sending data on the behavior to an overseer of the vehicle when the behavior is not in accordance at least one of a law from the database and a safety instruction from the database.

According to some embodiments of the invention, the detecting include receiving data from a sensor including at least one of a speedometer, a position sensor, a microphone sensing sounds in the vehicle, a video camera receive images from inside the vehicle, a video camera receiving images from outside the vehicle, an accelerometer, a lidar, and a radar.

According to some embodiments of the invention, overseer includes at least one of police, a licensing authority of the vehicle, a licensing authority of the driver and an owner of the vehicle.

According to some embodiments of the invention, the method further includes; determining a driver identification.

According to some embodiments of the invention, the determining includes imaging a face of the driver and recognizing the driver using face recognition software.

According to some embodiments of the invention, the determining includes recording a voice of the driver and recognizing the driver using voice recognition software.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
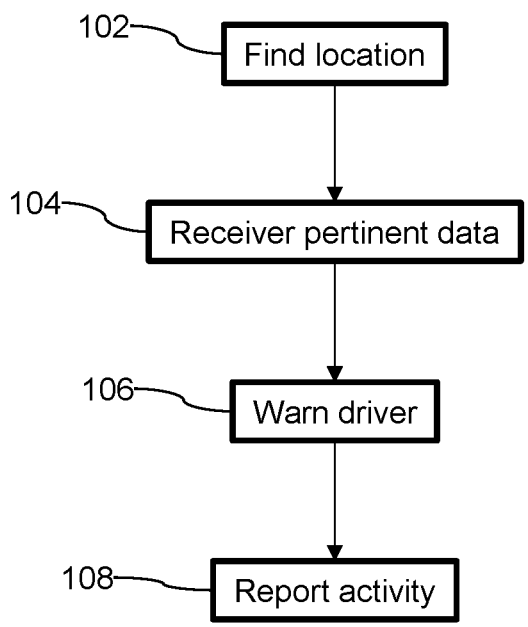
FIG. 1 is a flow chart illustration of a method of vehicle warnings in accordance with an embodiment of the current invention.

The present invention, in some embodiments thereof, relates to a for informing a driver and, more particularly, but not exclusively, a system that warns a driver and/or reports dangerous driving.

Overview

An aspect of some embodiments of the current invention relates to a system to warn a driver about driving laws and/or conditions. Optionally, the system includes a database of traffic laws. Optionally the laws are indexed according to location and/or time and/or conditions. In some embodiments, a display in a car will display information that has in the past been displayed on street signs. For example, a speed limit and/or a limit on parking. For example, the speed displayed may reflect local weather conditions, temporal changes and/or other local conditions. In some embodiments, warnings may be customized to a particular vehicle and/or driver. For example, a truck may receive warnings and/or limits that are particular to that type of vehicle.

An aspect of some embodiments of the current invention relates to a system to warn a third party about driving behavior and/or legal infringements. Optionally, the system includes a database of traffic laws and/or safe driving requirements. Optionally the laws are indexed according to location and/or time and/or conditions. In some embodiments, when a driver behaves in a dangerous and/or illegal way, a report will be sent to an overseer and/or an authority. Optionally, a report may be sent immediately and/or a report may be compiled over time and the overseer and/or authorities will be updated periodically. Optionally, for some infringements, a report will be made immediately and/or for less urgent infractions the cost will be tallied up and/or charged and/or reported together.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flow chart illustration of a method of vehicle warnings in accordance with an embodiment of the current invention. A system will track 102 a location of a vehicle. Optionally, the system will also include a database which may include traffic law data and/or temporal condition data. For example, the system may receive 104 data from various sources about local weather, road conditions. For example, the database may be updated by authorities (e.g. the police and/or a public works agency that does road work). Alternatively or additionally, the system may have automatic linking to a weather service. Alternatively or additionally, the system may receive 104 updates from a community-based information collecting system (for example, Waze).

Optionally the system will inform 106 to driver of legal and/or safety information. For example, the system may inform 106 a user of a current local speed limit. For example, the speed limit may take into account the current weather. For example, during fog and/or rain and/or at a time of school openings and/or when there is local road work, the speed limit may be reduced. Alternatively or additionally, the system may compare data on the behavior of a driver to data on driving laws and/or inform 106 a driver and/or report 108 to a third party when the driver is driving significantly faster than the average speed on a particular road and/or beyond a legal and/or adjusted speed limit and/or has performed a dangerous maneuver (for example taking a left from a right side of the street). In some embodiments, the system will positively identify a driver. For example, this may help authorities determine and/or punish people guilty of traffic infractions.

In some embodiments, a driver may be informed 106 of legal limitations and/or dangerous situations via text on a view screen. Alternatively or additionally, the user may be informed 106 via a light (e.g. a blinking LED and/or a glowing and/or blinking display screen). Alternatively or additionally, a user may be informed 106 by an audio signal. Alternatively or additionally, a driver maybe informed 106 via a symbol, for example an icon on a display screen.

In some embodiments, a vehicle warning system may inform a car owner of certain legal infractions and/or dangerous practices (for example, in the case where a person other than the owner is driving the car [for example for a rented vehicle and/or for a car driven by the owner's child etc.]). Alternatively or additionally, some infractions may be reported 108 to police and/or other authorities. Optionally, some less serious infractions may go unreported and/or may not be reported 108 individually but may be reported in 108 statistical data etc. In some embodiments, certain infractions will only be reported 108 if they continue for a certain period of time and/or when they are repeated a certain number of times.

Figure 2:
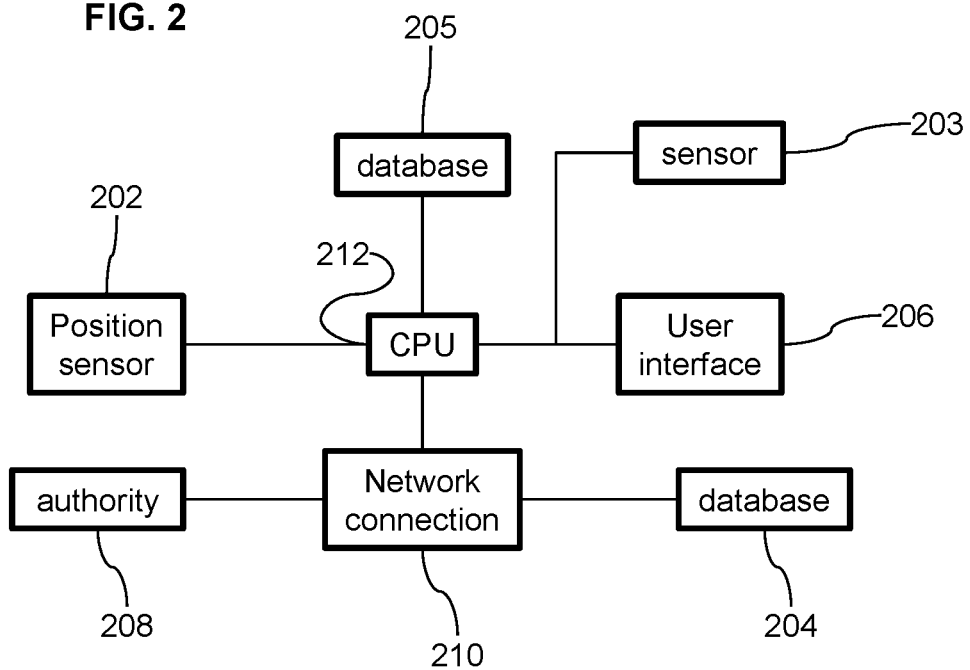
FIG. 2 is a block diagram illustration of a system of issuing vehicle warnings in accordance with an embodiment of the current invention.

FIG. 2 is a block diagram illustration of a system of issuing vehicle warnings in accordance with an embodiment of the current invention. Optionally a system may include a position sensor 202, for example a GPS unit connected to a vehicle. In some embodiments, the system may include a database 204 of driving conditions and/or laws. Optionally, all or part 205 of the database (for example that which pertains to a current location and/or information about the vehicle) may be stored on board. Alternatively or additionally, all or part of the database 204 may be stored remotely. For example, a processor 212 may process data, for example, comparing a location with a map to determine a street location and/or pertinent traffic laws. For example, the processor 212 may process data, for example, comparing a traffic laws with car sensors to determine whether the car is being driven in safe/legal manner or not. Optionally, processor 212 may be located on the vehicle. For example, an on-board processor may receive data on law and/or weather or the like from a database over a wireless network using a transceiver 210 and/or report driving behavior over a wireless network using a transceiver 210. Alternatively or additionally, processor 212 may be located remotely from the vehicle. For example, a remote processor may receive data on behavior of the driver from onboard sensors over a wireless network using a transceiver 210 and/or inform a driver (e.g. connect to a user interface 206) via wireless network using a transceiver 210.

In some embodiments, a system may include some or all of various kinds of sensors 203. For example, the system may include a navigational sensor such as an accelerometer and/or a gyro. Optionally the system may include an optical sensor, for example the system may be integrated to a Mobileye device. In some embodiments, the system may include a laser and/or radar device, for example a range finder. In some embodiments, the system may include a driver recognition sensor. For example, the driver recognition sensor may include a finger print reader and/or a camera with facial recognition software and/or a microphone with voice recognition software. For example, the camera may check at any time to make sure that the right person is in the driver's seat. For example, the finger print reader may be on a steering wheel to and/or may check while the car is driving, for example to make sure that the right person is driving the car. Optionally, a system may be integrated with on board sensor 203 of a car and/or external sensors 203 (for example the system may be integrated with municipal speed detectors and/or traffic control cameras etc.). For example, the system may receive data from these systems and/or send data to authorities 208 (for example an image captured by as sensor of the system when a traffic light camera captured an image of a transgression).

In some embodiments, a vehicle warning system may include a user interface 206. For example, the system may include a dedicated microphone and/or be integrated with a cell phone (e.g. use the microphone of the cell phone) and/or be integrated with a microphone built into a car. For example, the system may oral instructions. Alternatively or additionally, the system may include a view screen and/or a loudspeaker.

Figure 3:
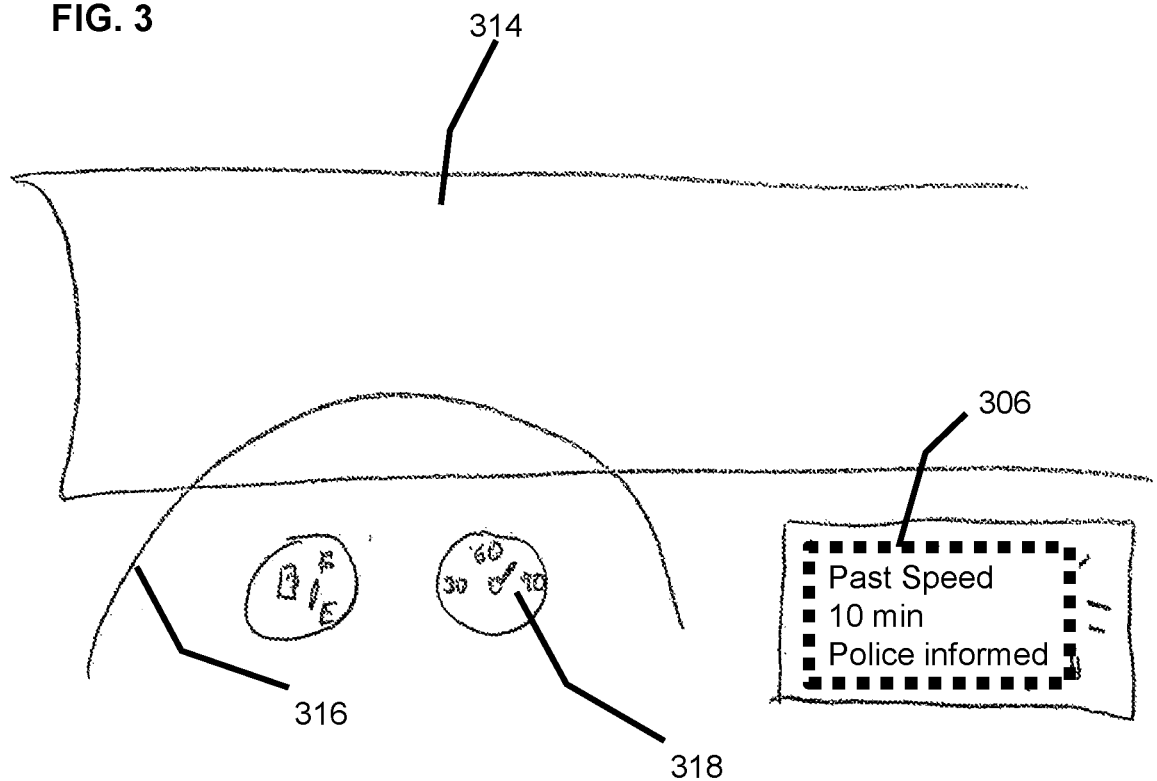
FIG. 3 is a schematic illustration of a driver warning system in accordance with an embodiment of the current invention.

FIG. 3 is a schematic illustration of a driver warning system in accordance with an embodiment of the current invention. In some embodiments, a warning system may warn drivers when they have violated a traffic law. For example, a message may flash on a display 306 visible near a car windshield 314 and/or near car controls such as a steering wheel 316 and/or a speedometer 318. Alternatively or additionally, an audible warning may warn a driver that he is violating a traffic law and/or performing a dangerous maneuver and/or that the police have been informed of his infraction. Optionally there may be a grace period (for example, passing a speed limit for a few seconds may not be reported, but infractions for more than 10 minutes may be reported) and/or there may be a report threshold. For example, driving 5 mph over the speed limit may not be reported immediately whereas driving 10 mph over the speed limit may be reported.

In some embodiments a car may be required to have a working warning system by law. Optionally, this may reduce the need of physical signs along roads saving money for municipalities.

Figure 4:
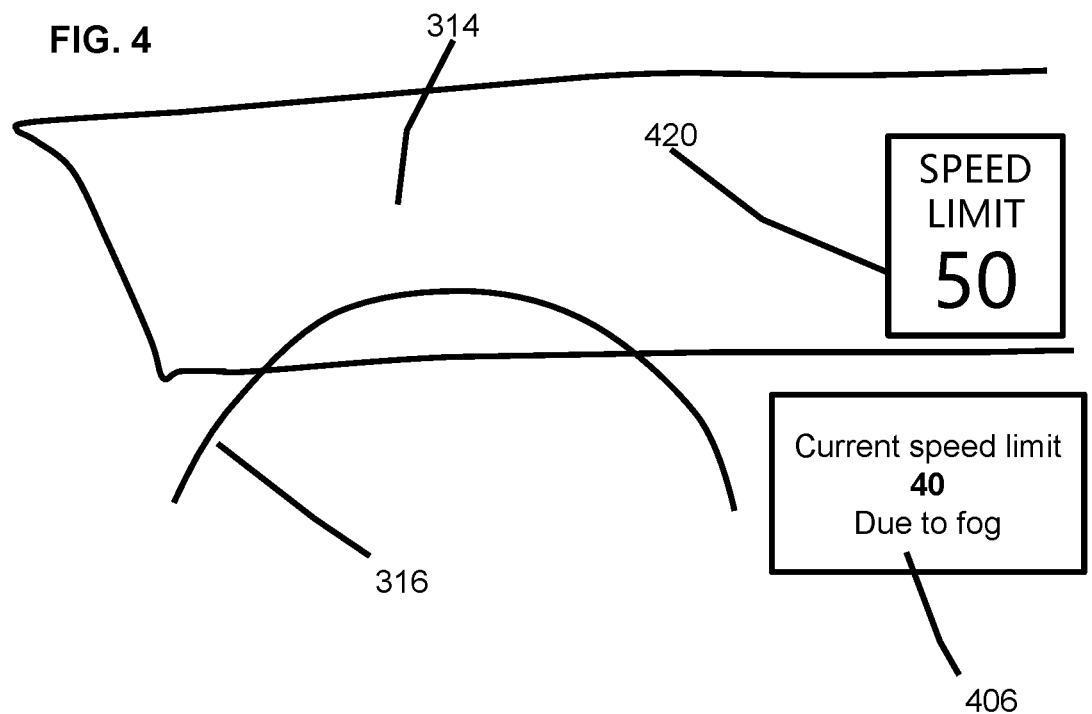
FIG. 4 is a schematic illustration of a police warning system in accordance with the current invention.

FIG. 4 is a schematic illustration of a police warning system in accordance with the current invention. In some embodiments, a warning system may update according to changes in laws in accordance with local and/or temporal conditions. For example, instead of a static sign 420 which may show a fixed speed limit e.g. 50 mph at all times, the system may include a display 406 that informs a driver that a "current" speed limit is 40 mph for example due to the presence of fog and/or due to a school letting out in the area. Alternatively or additionally, the warning system of one vehicle may communicate with nearby vehicles and/or update a warning due to the presence of the other vehicle. For example, when a school bus and/or a liquified gas truck is in the vicinity, the speed limit may be adjusted. Alternatively or additionally, the system may be recognized other vehicles using a sensor and/or through information from a tracking system. Optionally, a warning system may also suggest a parking spot and/or inform a driver when a parking spot is legal and/or how long he is allowed to park in a spot and/or the system may send a message to the driver when his parking permit is about to expire.

Figure 5:
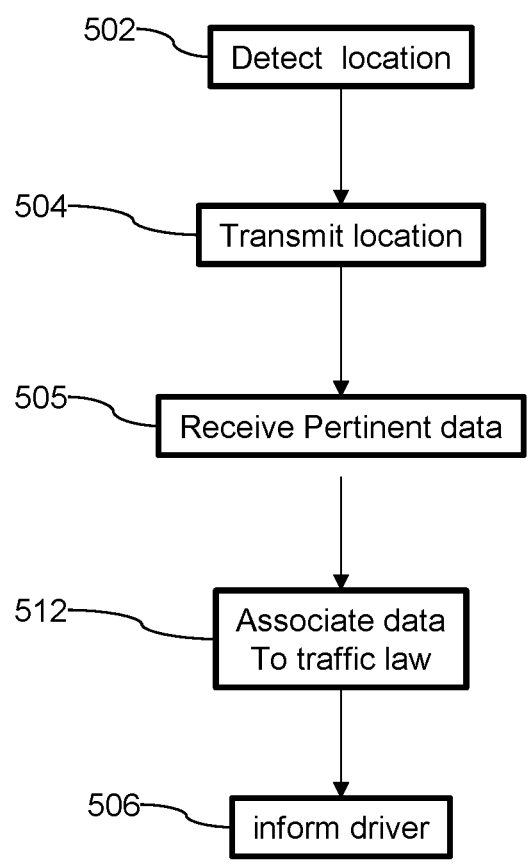
FIG. 5 is a flowchart illustration of a method of informing a driver in accordance with an embodiment of the current invention.

FIG. 5 is a flowchart illustration of a method of informing a driver in accordance with an embodiment of the current invention. In some embodiments, a sensor detects 502 a location of a vehicle. Optionally, the sensor may include an onboard sensor (for example a GPS device). Alternatively or additionally, an external sensor (for example a license plate reader and/or radar). Optionally, the location is transmitted 504 to a databank. For example, the databank may include geographical data for example for recognizing a street on which the vehicle is traveling from the location. Alternatively or additionally, the databank may include data on transient conditions. For example, the databank may include a weather service available over the Internet and/or a crowd based database on road conditions (e.g. traffic, construction, school hours). Alternatively or additionally, the databank my include legal data, for example traffic laws pertinent to the location and/or temporal conditions. Optionally, the various data is received 505 wirelessly by the on-board processor and/or the on-board processor associates 512 the various data to derive a current traffic law and/or safety recommendation (e.g. slow down there is fog ahead and the road is winding and/or there is a school letting out children ahead etc.). Alternatively or additionally, a remote processor makes the associations 512 and transmits laws and/or recommendations to the local server. The local server informs 506 a driver of the recommendation and/or the law.

In some embodiments, the databank includes data on physical condition (transient or long term) of a road surface at the location (for example is it a material that get slippery when wet, are there potholes, is there construction, are there sharp curves and/or steep inclines). For example, the databank may include a crowd source databank (for example as kept by Waze) and/or a municipal databank. Optionally, recommended safety instructions and or legal data is adjusted for the temporal and/or local data of the database.

In some embodiments, the databank includes schedule information of an educational institution. For example, when a driver is heading towards a school that is sending children home, the driver may be told to slow down.

In some embodiments, data may be supplied on the vehicle. For example, a local database on the vehicle may supply data on the kind and condition of the vehicle. The data on the vehicle may be used to determine the legal and/or safety recommendations. For example, a truck may be told not to use a certain road which has a weight limit and/or a bus driver may be told that he must travel slower and/or in a right lane etc.

Optionally the databank may include schedule information on parking. For example, the driver may be told whether he can park in a location and/or how long he can remain. This may save a lot of congestion caused by drivers wanting to park and being delayed as they read long instructions on signs giving signs and/or restrictions on parking in a particular location.

In some embodiments, the system may include a sensor and/or sense a behavior of a vehicle and/or a driver. For example, the system may warn the driver when he is behaving dangerously and/or breaking a traffic law.

Figure 6:
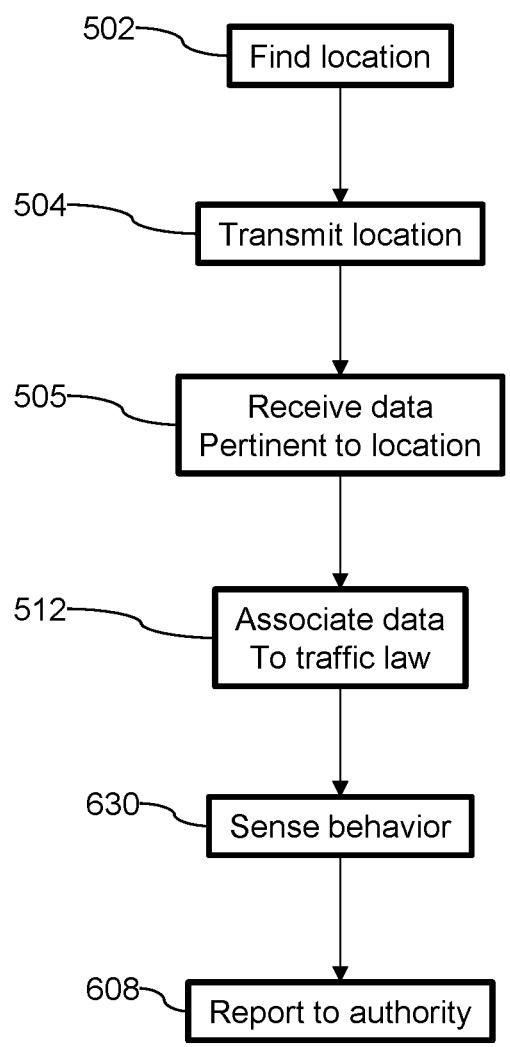
FIG. 6 is a flow chart illustration of a method of reporting to an authority of a driving behavior in accordance with an embodiment of the current invention.

FIG. 6 is a flow chart illustration of a method of informing an authority of a driving behavior in accordance with an embodiment of the current invention. In some embodiments, a car owner who gives use of his car to others (e.g. a rental agency, a father, a business with a fleet of vehicles, a government organ with vehicles (e.g. police, postal service, army)) may install a system to track behavior of drivers. For example, the system may track a vehicle, laws and/or behavior for example as described in regards to FIG. 5. Optionally, the detected behavior is detected 630 reported 608 to an authority (e.g. a legal authority (for example traffic police, a vehicle licensing authority and/or a driver's license authority and/or a car owner)). Alternatively an traffic and/or licensing authority may require cars to have such a system.

In some embodiments, a sensor may detect 630 an identification of a driver and/or driving behavior. For example, the sensor may include a speedometer, a position sensor, a microphone sensing sounds in the vehicle, a video camera receiving images from inside the vehicle, a video camera receiving images from outside the vehicle, an accelerometer, a lidar, and/or a radar. In some embodiments, the identification of a driver may be determining by imaging a face of the driver and recognizing the driver using face recognition software and/or by recording a voice of the driver and using voice recognition software and/or by reading a fingerprint.

Figure 7:
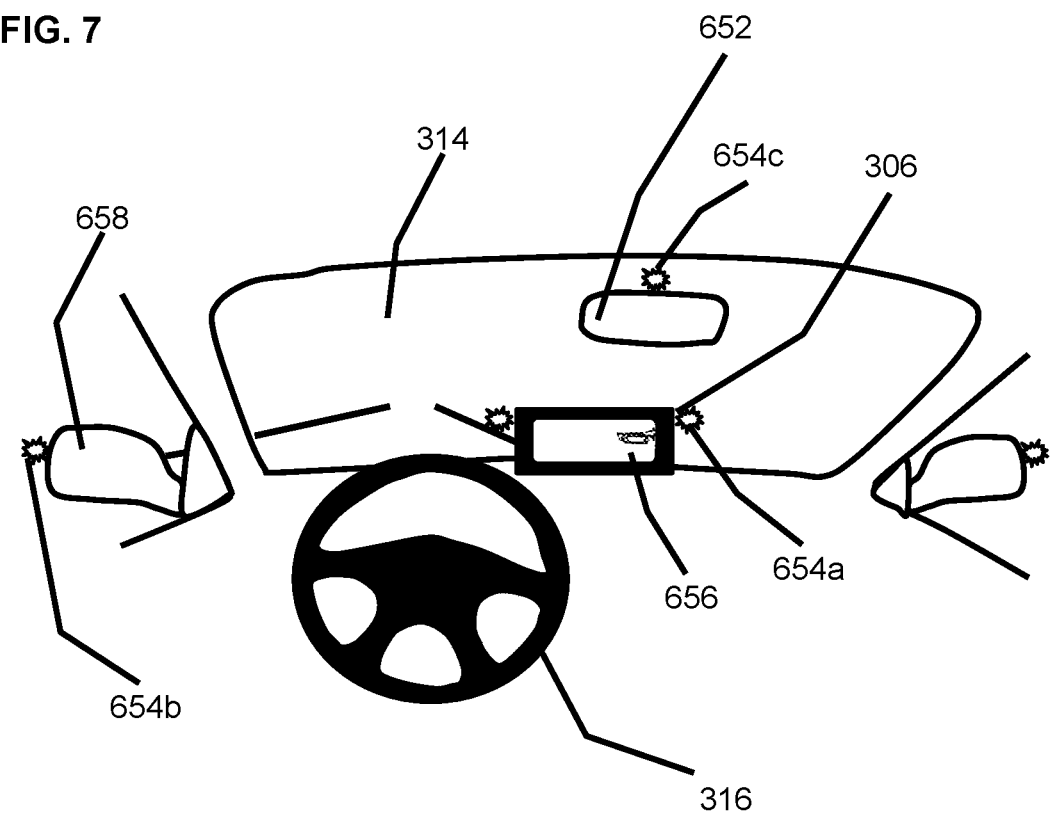
FIG. 7 is a schematic illustration display in accordance with an embodiment of the current invention.

FIG. 7 is a schematic illustration display in accordance with an embodiment of the current invention. For example, the system may be configured for helping a driver who is deaf and/or hard of hearing. For example, The system may include warning lights in various locations that light to warn a driver that he may need to pay attention to something happening around him. For example, for a driver hard of hearing, there may be sound sensors (e.g. microphones) at various locations around the car. When there is a suspicious sound (e.g. a horn and/or a bang etc.) a warning light 654a, 654b, 654c may light. Alternatively or additionally, a warning icon 656 may appear on a screen 306. In some embodiments, the icon 656 may tell the driver what was the sound (for example, a picture of a horn on the right side of the screen to tell the driver that a car beeped its horn on his right side). For example, a position of the icon 656 and/or the warning light 654a, 654b, 654c may tell the driver where is the problem. For example, a light 654c on a rear view mirror 652 may warn him of an event behind the car and/or a light 654b on a side mirror 658 may warn him of an event on that side of the car and/or a light 654a on a side of a screen 306 may warn of an event on that side of the car. Optionally, the light may blink 654a, 654b, 654c to symbolize one kind of event (e.g. a sound) and/or the light 654a, 654b, 654c may remain on for another event (e.g. a car moving into his lane).

Figure 8:
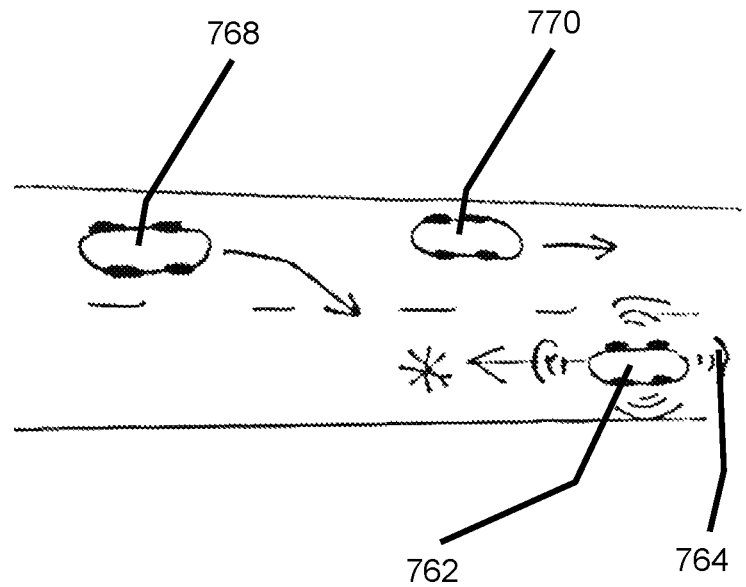
FIG. 8 is a schematic illustration of warning system in accordance with an embodiment of the current invention.

FIG. 8 is a schematic illustration of warning system in accordance with an embodiment of the current invention. In some embodiments a car 762 will includes sensors 764 (for example radar, lidar, an image sensor, microphones etc.) that sense occurrences around the car 762. For example, the system may sense a car 768 ahead passing another car 770 and moving into an oncoming lane 772. The system may issue a warning (e.g. a sound, lighting an LED and/or displaying a warning on a view screen).

In some embodiments a driver warning system may include a network connection. For example a driver may be able to contact the car using a personal computing device. Optionally, the system may include a positioning subsystem (e.g. a GPS). For example, when the driver cannot find his car (e.g. he forgot where he parked) he may be able to query the warning system using his cell phone and receive a position report. Alternatively or additionally, the system may include a beacon (e.g. a radio beacon and/or visible beacon) that can be activated to make it easy to find the car.

It is expected that during the life of a patent maturing from this application many relevant technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A driver warning system comprising:
a computer display configured for viewing by the driver while driving an on road vehicle;
an on board processor configured to travel with said on road vehicle and the driver;
a position sensor configured to travel with said on road vehicle and said driver;
a wireless transceiver configured to travel with said on road vehicle and said driver;
a database with data available to said on board processor, said database including data on street locations and at least one of traffic laws and safety instructions for driving;
wherein said processor is configured to receive data on transient conditions over said wireless transceiver and wherein said traffic laws include laws that are dependent on said transient conditions and wherein said processor is configured to display a traffic law to the driver on said display updated according to said transient conditions,
wherein said database further includes data on a physical condition of a road surface and wherein said processor is configured to display safety instructions accounting for said physical condition of said road surface.

2. The system of claim 1, wherein said processor is configured to receive weather updates over said wireless transceiver and to display a traffic law dependent on a current weather condition.

3. The system of claim 2, wherein said updated traffic law includes a speed limit.

4. The system of claim 1, wherein said processor is configured to receive schedule information of an educational institution and to display a traffic law dependent on a schedule of a nearby educational institution.

5. The system of claim 1, wherein said processor is configured to receive updates on road condition over said wireless transceiver from a crowdsource based database and wherein said processor is configured to display safety instructions accounting for data from said crowdsource based database.

6. The system of claim 1, further comprising a database of specifications of said vehicle in communication with said processor and wherein said processor is configured to display safety instructions accounting for said specifications.

7. The system of claim 1, wherein said processor is configured to receive schedule information of parking and to display parking instructions dependent on said schedule.

8. The system of claim 1, further comprising:
a sensor detecting a behavior of said driver said sensor reporting results to said processor and
wherein said processor is configured to send data on said behavior to an overseer of the vehicle when said behavior is not in accordance at least one of a law from said database and a safety instruction from said database,
wherein said system further comprises a driver identification subsystem.

9. The system of claim 1, wherein said sensor includes at least one of a speedometer, said position sensor, a microphone sensing sounds in the vehicle, a video camera receiving images from inside the vehicle, a video camera receiving images from outside the vehicle, an accelerometer, a lidar, and a radar.

10. The system of claim 8, wherein said overseer includes at least one of police, a licensing authority of the vehicle, a licensing authority of the driver and an owner of the vehicle.

11. The system of claim 8, wherein said driver identification subsystem includes a camera and face recognition software.

12. The system of claim 8, wherein said driver identification subsystem includes a microphone and voice recognition software.

13. The system of claim 8, wherein said driver identification subsystem includes a fingerprint reader.

14. A method of warning a driver of a vehicle comprising:
detecting a location of the vehicle;
receiving data on a transient condition at said location, wherein said condition comprises schedule information of an educational institution;
transmitting at least one of said location and said data to a databank over a wireless transceiver;
associating by a processor of said location and said condition to a traffic law;
displaying said traffic law to the driver.

15. The method of claim 14, wherein said condition includes a weather update.

16. The method of claim 15, wherein said traffic law includes a speed limit.

17. The method of claim 14, wherein said condition includes a physical condition of a road surface at said location and said displaying includes safety instructions accounting for said physical condition of said road surface.

18. The method of claim 14, wherein said processor is configured to receive updates on road condition over said wireless transceiver from a crowdsource based database and wherein said processor is configured to display safety instructions accounting for data from said crowdsource based database.

19. The method of claim 14, further comprising receiving data on specifications of said vehicle and wherein said displaying includes safety instructions accounting for said specifications.

20. The method of claim 14, further comprising receiving schedule information of parking at said location by said processor and displaying parking instructions to said driver dependent on said schedule.

21. The method of claim 14, further comprising:
detecting a behavior of said driver by said processor and sending data on said behavior to an overseer of the vehicle when said behavior is not in accordance at least one of a law from said database and a safety instruction from said database.

22. The method of claim 14, wherein said detecting include receiving data from a sensor including at least one of a speedometer, a position sensor, a microphone sensing sounds in the vehicle, a video camera receiving images from inside the vehicle, a video camera receiving images from outside the vehicle, an accelerometer, a lidar, and a radar.

23. The method of claim 21, wherein said overseer includes at least one of police, a licensing authority of the vehicle, a licensing authority of the driver and an owner of the vehicle.

24. The method of claim 21, further comprising determining a driver identification.

25. The method of claim 24, wherein said determining includes imaging a face of said driver and recognizing said driver using face recognition software.

26. The method of claim 24, wherein said determining includes recording a voice of said driver and recognizing said driver using voice recognition software.

* * * * *